United States Patent Office 3,071,227
Patented Jan. 1, 1963

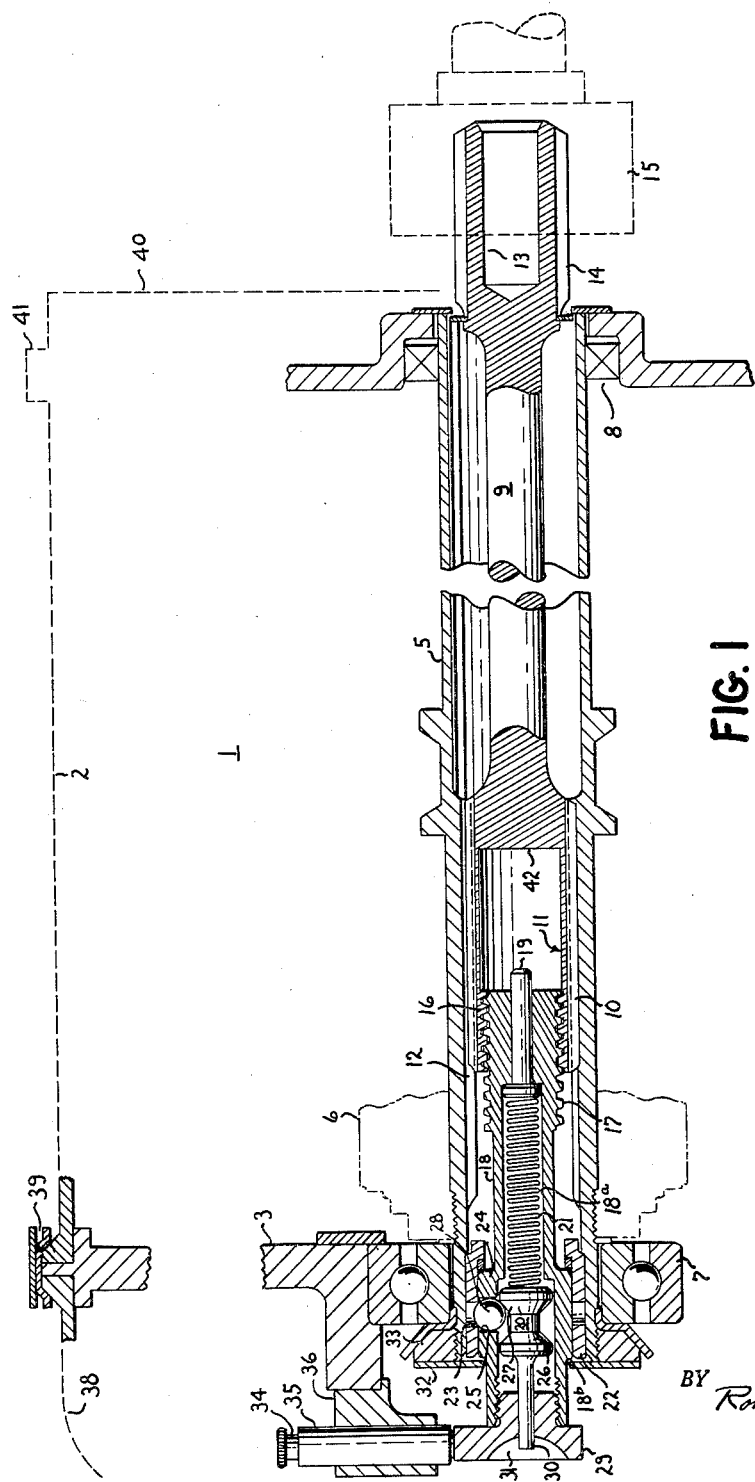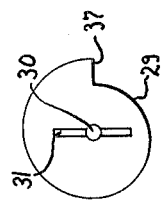

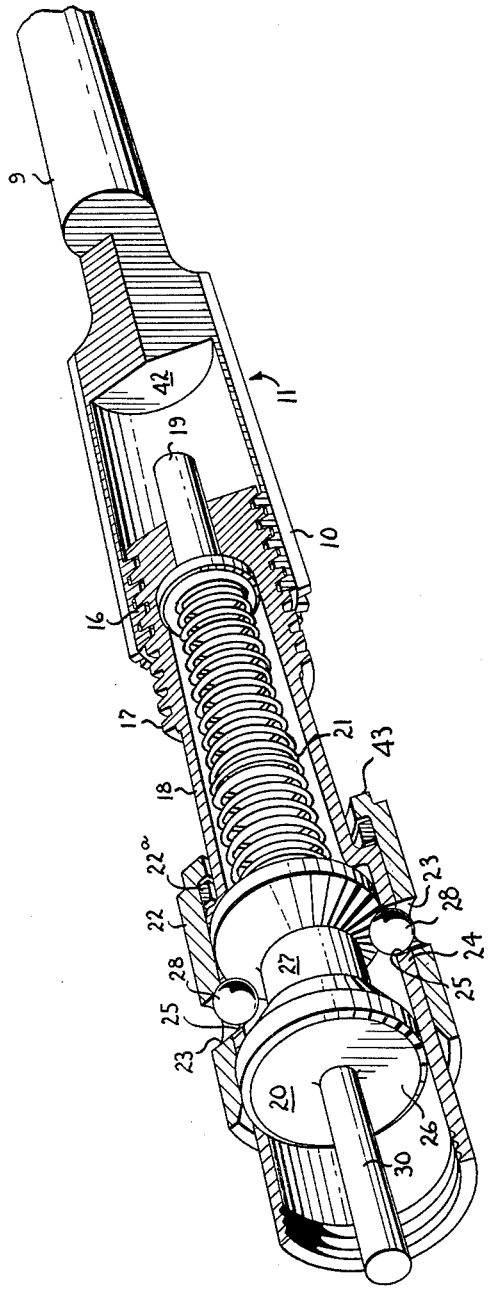

3,071,227
AUXILIARY UNIT DRIVE MECHANISM
Carl A. Grisier, Jr., Erie, Pa., assignor to General
Electric Company, a corporation of New York
Filed Jan. 30, 1961, Ser. No. 85,816
6 Claims. (Cl. 192—101)

This invention relates to an auxiliary unit drive mechanism, and more particularly relates to such a mechanism incorporated within the auxiliary unit which may be quickly and positively disconnected from a driving means and is so constructed that the mechanism may be quickly and positively reconnected to the driving means without replacement of any parts, dismantling of equipment, and without requiring special tools.

The invention may be considered an improvement to the invention disclosed in the copending application of Clifford F. Travis and Charles F. Renner, Serial No. 61,776, filed October 10, 1960 and assigned to the same assignee as the present invention. The present invention is particularly adaptable for use in aircraft auxiliary units and is disclosed in that environment. Among the requisites of all aircraft equipment are: compact size, low weight, accessibility for maintenance and inspection, and reliability when subjected to extreme operating conditions, particularly shock and vibration. In the majority of aircraft generator installations, the drive end of the generator is mounted on a mounting pad on a gear box associated with the engine. The generator being cantilevered from the mounting pad is subjected to extreme vibration.

In airborne installations, for the safety of the plane and the crew, it is often necessary to de-activate auxiliary units, e.g., a generator. This disengagement of the generator from its drive may be necessary upon occurrence of electrical circuit faults or faults which may occur in the generator, such as an overheated bearing. It is further highly desirable to disengage a faulty generator from the engine in order that the engine will not have to be shut down, and thus have the aircraft lose thrust because of a generator fault. However, it is further highly desirable to be able to reinstate auxiliary loads by reconnection of a generator to an engine upon cessation of an emergency condition of the other generators will not carry the required electrical load. Mechanisms provided for effecting such a disengagement of a generator from its driving means should possess the aforementioned requisites for aircraft use and be so arranged that they would not be adversely affected by shock and vibration to which they might be exposed; particularly there should be no tendency for the mechanism to become disconnected from its driving means due to shock or vibration, and similarly, if disconnected, such adverse operating conditions should not tend to cause an undesired reconnection.

It is therefore a primary object of this invention to provide a compact and reliable auxiliary unit drive mechanism which may be easily disconnected and reconnected to a drive means, and which is positively held in either a driving or disconnected condition despite subjection to severe vibration. The features of the invention which are believed to be novel are defined with particularity in the appended claims. However, the invention may best be understood by reference to the following description taken in connection with the accompanying drawing wherein:

FIGURE 1 is an elevation view in section showing the component parts of an auxiliary unit drive mechanism which embodies the invention incorporated within a generator;

FIGURE 2 is a view of a cam member seen from the outboard end of the generator of FIGURE 1; and FIGURE 3 is a perspective view partially in section showing an auxiliary unit drive mechanism embodying the invention.

Referring now to the drawing, wherein like reference characters designate like parts throughout the views, there is shown a generator 1 having a housing 2 and end frames 3 and 4, each being provided with openings therein for receiving a hollow quill shaft 5 adapted for rotation therein. The quill shaft 5 has a rotor 6 mounted thereon and is rotatably supported in end frames 3 and 4 by bearing assemblies 7 and 8.

A torque rod 9, which is flexible to some degree to withstand torsional stresses, is positioned concentrically within quill shaft 5 and is provided with splines 10 on end 11 thereof, which engage splined grooves 12 on the inner peripheral surface of quill shaft 5. The opposite end 13 of the torque rod 9 may be equipped with a similar set of splines 14 which mesh with splined grooves, not shown, in a driving member or driving member coupling device 15. The coupling device 15 may be driveably connected to an engine drive member, not shown, arranged for transmitting rotational power through coupler 15 to torque rod 9 to hence drive the generator.

To allow disconnection of the torque rod 9 from the coupler 15, the torque rod 9 is axially moveable within the quill shaft 5. Threads 16 within the splined portion end of 11 of torque rod 9 engage mating threads 17 of disconnect device or shaft 18, hereinafter referred to as a screw shaft. In operation, the screw shaft and torque rod rotate at the same speed when the quill shaft 5 is being driven. However, should the screw shaft 18 be blocked from rotating, the threads 16 of the torque rod will advance on threads 17 of the screw shaft and the torque rod will move axially into quill shaft 5 withdrawing end 13 from engagement with coupler 15 to disconnect the generator 1 from its driving means.

In accordance with the present invention, I provide means to prevent undesired relative rotation between the torque rod 9 and screw shaft 18 which would tend to disconnect torque rod 9 from the coupler 15, due to stresses, such as shock and vibration, to which the generator might be subjected. The provided means are further effective to prevent an undesired reconnection of the torque rod 9 to the coupler 15 after disconnection. The disconnect mechanism is also so constructed as to facilitate reconnection of the torque rod 9 to the coupler 15 without removing the generator from its mount.

The disconnect mechanism comprises the screw shaft 18, having a hollow portion 18a, a first plunger 19, and a second plunger 20, with a coil spring 21 compressed therebetween. Secured on the inner periphery within the quill shaft at the outboard end thereof and concentric therewith, and surrounding a portion of screw shaft 18, is a sleeve or bushing 22 having a plurality of sockets or apertures 23 therein, the sockets 23 having their axes residing in a common plane perpedicular to the longitudinal axis of the screw shaft 18. Provided in portion 24 of screw shaft 18 is a second plurality of sockets or apertures 25 having their axes in a common plane. The number of sockets 23 and 25 are a matter of choice and design, dependent on the diameter of the screw shaft and the diameter of the balls 28. In one embodiment of the invention wherein the sleeve has an outside diameter of slightly less than one inch, I provide six sockets in the sleeve spaced 60° and three sockets in screw shaft 18 spaced 120°, together with three balls 28. Plunger 20 has a generally spool or spindleshaped portion 26 which provides a tapered or conical surface 27. It will be noted that the spring 21 in compression will exert a force tending to move spindle 20 towards the outboard end of quill shaft 5 and the tapered surface 27 will tend to force detent elements such as balls 28 located in sockets 25 into sockets 23 to thereby secure screw shaft 18 to quill shaft 5, whereby screw shaft 18 and quill shaft 5 will have no relative rotation. The diameter of the balls 28 is preferably chosen to be slightly less than the diameter of sockets 25 by about 0.010 inch. The diameter of sockets 23 is chosen in accordance with the dimension by which the balls 28 extend therein. For example only, where the balls 28 are 0.250 inch in diameter and the thickness of the sleeve is about 0.10 inch, the sockets 23 are made about 0.18 inch in diameter. It will be seen that the sockets 23 and 25 together with the spring-biased balls 28 comprise a detent mechanism.

A cam member 29 is threaded within the outboard end of screw shaft 18 and stem portion 30 of plunger 20 normally extends therethrough into slot 31 in cam member 29. The screw shaft is retained within the quill shaft by means of a washer-like member 32 which depends over shoulders 18b of screw shaft 18 at the outboard end of quill shaft 5. The washerlike member 32 may be secured to a nut 33 by screws or bolts, not shown, which is threaded on the quill shaft 5 at the outboard end thereof. To block rotation of screw shaft 18, I provide blocking means such as a pin 34 within pin guide 35. Pin guide 35 is secured to end frame 3 by means of an adapter 36. Pin 34 may be lowered into engagement with lip or tab 37 on cam member 29 to block rotation thereof. The pin 34 may be caused to move down in the pin guide 35 and engage the tab 37 upon existence of a warning signal or upon command. For example, the pin 34 may be actuated by a solenoid, not shown, as explained in Patent 2,802,555 to Irving Kalikow, assigned to the same assignee as the present invention. The pin 34 may be caused to drop due to sensing of an overheated bearing or by an actuating mechanism, not shown, upon receipt of a signal from a remote point.

Outboard end cover member 38 which may be an air blast cap, is removably secured to end frame 3 and housing 2 by means of a readily removable tensioning band 39 with a latching mechanism, not shown, to allow removal of cover 38. For aircraft installation, a mounting adapter 40 is provided on the drive end of the generator which is adapted to be secured to a generator mounting pad, not shown, associated with the driving shaft or coupler 15. The mounting adapter may be secured to the housing 2 at a point 41 in the same manner in which the outboard end cover 38 is secured to housing 2. A preferred generator mounting arrangement is shown in Irving Kalikow Patent 2,645,538, assigned to the same assignee as the present invention.

In operation, power is normally transmitted through the coupler 15 through torque rod 9 to quill shaft 5 by means of the splined connection of the torque rod 9 to coupler 15, and engagement of splines 10 and 12. At this time pin 34 does not engage tab 37 and balls 28 are urged through sockets 25 in screw shaft 18 partially into sockets 23 in sleeve 22 by virtue of the tapered surface 27 of plunger 20 and the compressed spring 21 within the screw shaft between plungers 19 and 20. By virtue of this biased detent type locking arrangement, the screw shaft 18 is biased into locking engagement with quill shaft 5 and there will be no relative rotation therebetween and inasmuch as torque rod 9 is splined internally of quill shaft 5, the torque rod 9 and screw shaft 18 will rotate at the same speed when torque rod 9 is driven.

When it is desired to disengage the torque rod 9 from coupler 15, or upon sensing of some generator fault, the pin 34 will be caused to drop in pin guide 35 and engage tab 37 of cam 29. This blocks rotation of screw shaft 18 and the balls 28 are forced out of sockets 23 and the torque rod 9 being driven through coupler 15 is caused to thread onto screws 16 of screw shaft 18, thereby axially advancing the torque rod 9 upon the screw shaft and withdrawing splines 14 from the coupler 15. After the torque rod has been disengaged from the drive, the torque rod will advance on the screw shaft 18 until plunger 19 bottoms on wall 42 of the torque rod. Portions 43 of sleeve 22 also provide a stop for the torque rod. It will be noted from the drawings that the internal splines 12 within quill shaft 5 are of sufficient length so that the torque rod splines 11 are always engaged therewith. Also, the threaded portions 16 and 17 of screw shaft 18 and torque rod 9 respectively are so chosen that threads 16 overrun threads 17 and plunger 19 bottoms against wall 42. A thrust collar 22a is provided to prevent galling of screw shaft 18 and sleeve 22 during a disconnect operation.

After the torque rod 9 has been disconnected from the coupler 15 and the quill shaft 5 has ceased to rotate, the spring 21 exerts force in two directions to force the balls 28 into the sockets 23 of sleeve 20 to thereby prevent rotation of the screw shaft relative to the quill shaft; therefore, inasmuch as the screw shaft is locked to the quill shaft, and due to the connection of splines 10 and 11, there can be no relative rotation between the torque rod 9, the quill shaft 5 and the screw shaft 18. And further, in view of the threads 16 overrunning threads 17, there can be no axial movement of the torque rod due to shock or vibration. Also, since the inner shaft is moved axially toward the outboard end of the generator, it can be seen that the plunger 19 will bottom inside the torque rod on wall 42. The bottoming of the plunger takes place before the threads 16 and 17 are completely disengaged. This causes the spring to be compressed to exert an axial force towards the drive end on the plunger 19. This force on the plunger 19 will aid in threading torque rod 9 back on to screw shaft 18 when it is desired to reconnect splines 14 to coupler 15.

The torque rod 9 may be very easily reconnected to the driving means. This is acomplished by first removing cover 38 and raising pin 34 from engagement with tab 38, then inserting a screwdriver or other suitable tool into slot 31 in cam member 29. The screwdriver or other suitable tool will engage stem portion 30 of plunger 20 and move plunger 20 against the bias of spring 21. When spindle portion 26 moves to the right, as shown in FIG. 1, the bias on balls 28 is released. The plunger 19 will exert a force on wall 42 to cause threads 16 to re-engage threads 17. Rotation of the screw shaft 18 in the driven direction will then cause threads 16 of torque rod 9 to back off threads 17 of screw shaft 18 and move the torque rod 9 axially toward the drive end of the generator and back into engagement with the splined grooves, not shown, in coupler 15 to reconnect the generator to the coupler. The splines 14 may be chamfered at the ends thereof to facilitate such reconnection.

Reconnection may be accomplished when a multi-engine aircraft on which the generator 1 is mounted is in flight, if such reconnection is necessary. This may be accomplished by stopping the engine driving generator 1 or by disconnecting the coupler 15 from the driving means if a clutching arrangement is provided. Or, if a particular disconnected generator is not needed in flight, it may be easily reconnected upon landing by a ground crew member, and requires no tool other than a screwdriver or other device which can be inserted in slot 31.

While the illustrated embodiment of the invention, together with the elements illustrated therein, have been selected for purposes of illustration and disclosure, other modifications and embodiments of the disclosed invention may occur to those skilled in the art which do not depart from the spirit and scope of this invention. Accordingly, it is intended to cover all modifications of the invention and changes in the illustrations chosen for purposes of disclosure which do not constitute departures from the spirit and scope of the invention.

What I claim as new and desire to secure by Letters Patent of the United States is:

1. An auxiliary driven unit adapted to be driven by a prime mover means comprising a mechanism for transmitting torque from a prime mover to the auxiliary unit comprising, a hollow quill shaft having splines on its inner periphery, a torque rod having splines on one end thereof driveably engaging said quill shaft splines, said torque rod having a second end extending beyond one end of said quill shaft adapted to be driveably engaged by the prime mover means to transmit torque to said quill shaft, said torque rod being axially moveable in the driven means and into said quill shaft a distance sufficient to effect disengagement thereof from said driven means, a disconnect device within said quill shaft in threadable engagement with said one end of said torque rod, biased locking means normally locking said disconnect device into engagement with said quill shaft to prevent relative rotation therebetween, blocking means for overcoming the bias on said locking means and blocking rotation of said disconnect device to cause relative rotation between said device and said torque rod, said biased locking means being effective upon disconnection of said torque rod from the prime mover means to lock said disconnect device to said quill shaft whereby said disconnect device and said disconnected torque rod are both secured to said quill shaft to prevent relative rotation therebetween.

2. A machine adapted to be driven by prime mover means, a mechanism for transmitting torque from the engine to the auxiliary unit comprising, a hollow quill shaft having splines on its inner periphery, a torque rod having splines on one end thereof driveably engaging said quill shaft splines, said torque rod having a second end extending beyond one end of said quill shaft adapted to be driveably engaged by the prime mover means to transmit torque to said quill shaft, said torque rod being axially moveable in the driven means and into said quill shaft a distance sufficient to effect disengagement thereof from the prime mover means, a disconnect device within said quill shaft in threadable engagement with said one end of said torque rod, biased detent means for holding said disconnect device in engagement with said quill shaft to prevent relative rotation therebetween, blocking means for overcoming the detent bias and blocking rotation of said disconnect device to cause relative rotation between said device and said torque rod to disconnect said torque rod from said driven means, said detent means being effective upon disconnection of said torque rod from the engine to hold said disconnect device in engagement with said quill shaft whereby said disconnect device and said disconnected torque rod are both secured to said quill shaft preventing relative rotation therebetween.

3. A machine adapted to be driven by a prime mover and having a driving mechanism operative to be disconnected and reconnected from the outboard end of said machine comprising a hollow quill shaft rotatively mounted in said dynamoelectric machine and having axial splines on its inner periphery; a torque rod having splines on one end thereof driveably engaging said quill shaft splines, said torque rod having a second end extending beyond said quill shaft at the drive end of the machine adapted to be driveably engaged by prime mover driven means to transmit torque to said quill shaft, said torque rod being axially moveable in the driven means and into said quill shaft a distance sufficient to effect disengagement thereof from the driven means; a disconnect device within said quill shaft, said disconnect device comprising a disconnect shaft defining a cavity therein and having threads on one end thereof engaging mating threads on said one end of said torque rod whereby relative rotation between said torque rod and said disconnect shaft causes axial movement of said torque rod, means on the second end of said disconnect shaft closing said cavity, detent receiving means defined in said disconnect shaft, detent means arranged to fit into said receiving means, a plunger in said cavity, a spring element in said cavity, means defining detent socket means on said quill shaft disposed adjacent said receiving means, said spring arranged to cause said plunger to urge said detent means into said receiving means and said socket means to lock said disconnect shaft to said quill shaft, said plunger having a stem portion extending through said means closing said cavity, sufficient force applied to said stem portion against the bias of said spring being effective to release said detent means from locking engagement with said quill shaft to allow said disconnect shaft to be rotated relative to said quill shaft.

4. The machine of claim 3 wherein said detent receiving means comprise a plurality of apertures defined in said disconnect shaft having axes residing in a common plane perpendicular to the axis of the quill shaft, said detent socket means comprise a plurality of detent receiving sockets having axes in the same common plane and said detent means comprise a plurality of spherical detent elements.

5. The machine of claim 4 wherein the plunger includes a portion having a conical surface, said conical surface normally contacting said detent elements under the bias of said spring to urge said detent elements into said detent receiving apertures and sockets.

6. A dynamoelectric machine adapted to be driven by a prime mover and having a driving mechanism operative to be disconnected and reconnected from the outboard end of said machine comprising a hollow quill shaft rotatively mounted in said dynamoelectric machine and having axial splines on its inner periphery; a torque rod having splines on one end thereof driveably engaging said quill shaft splines, said torque rod having a second end extending beyond said quill shaft at the drive end of the machine adapted to be driveably engaged by prime mover driven means to transmit torque to said quill shaft; said torque rod being axially moveable in the driven means and into said quill shaft a distance sufficient to effect disengagement thereof from the driven means; a disconnect device within said quill shaft, said disconnect device comprising a disconnect shaft defining a cavity therein and having threads on one end thereof engaging mating threads within a recess in said one end of said torque rod whereby relative rotation between said torque rod and said disconnect shaft causes axial movement of said torque rod, a cam member having a blocking tab thereon on the other end of said disconnect shaft, a first plunger in the cavity extending into said recess, a plurality of apertures having their axes residing in a common plane defined in said disconnect shaft, detent means arranged to fit into said apertures, a second plunger, a spring element disposed between said plungers, means defining detent element sockets in said quill shaft disposed adjacent said apertures, said spring causing said second plunger to urge said detent means in said apertures and said sockets to lock said disconnect shaft to said quill shaft; means for engaging said blocking tab to block rotation of said disconnect shaft and cause relative rotation between said disconnect shaft and said torque rod and disconnection thereof from the driven means, blocking of said disconnect shaft being effective to overcome the locking bias exerted on said detent element by said spring; said torque rod threads being arranged to overrun said disconnect shaft threads when said disconnect shaft is blocked and bottom on said first plunger and compress said spring; said second plunger having a stem portion extending through said cam member, sufficient force applied to said stem portion against said spring being effective to release said detent means from locking engagement with said quill shaft, and the compressed spring being effective to aid re-engagement of the threaded portions of said torque rod and said disconnect shaft to re-engage.

References Cited in the file of this patent

UNITED STATES PATENTS

| | | |
|---|---|---|
| 1,773,607 | Vandecan | Aug. 19, 1930 |
| 2,509,813 | Dineen | May 30, 1950 |
| 2,802,555 | Kalikow | Aug. 13, 1957 |